United States Patent
Shim

(10) Patent No.: US 8,256,101 B2
(45) Date of Patent: Sep. 4, 2012

(54) APPARATUS FOR ATTACHING SUBSTRATES OF FLAT DISPLAY PANEL

(75) Inventor: Seok Hee Shim, Seongnam-si (KR)

(73) Assignee: ADP Engineering Co., Ltd., Seongnam-Si, Gyeongki-Do (KR)

( * ) Notice: Subject to any disclaimer, the term of this patent is extended or adjusted under 35 U.S.C. 154(b) by 1254 days.

(21) Appl. No.: 11/892,101

(22) Filed: Aug. 20, 2007

(65) Prior Publication Data

US 2008/0040916 A1 Feb. 21, 2008

(30) Foreign Application Priority Data

Aug. 21, 2006 (KR) .................. 10-2006-0078755

(51) Int. Cl.
*G02F 1/1341* (2006.01)
*H05K 13/00* (2006.01)
(52) U.S. Cl. ............................ 29/739; 29/743
(58) Field of Classification Search .............. 29/739, 29/830, 832, 729, 743; 349/1, 187; 156/556
See application file for complete search history.

(56) References Cited

U.S. PATENT DOCUMENTS

| | | | |
|---|---|---|---|
| 5,297,480 A * | 3/1994 | Miyashita et al. | 100/90 |
| 5,407,519 A | 4/1995 | Joffe et al. | |
| 6,646,689 B2 | 11/2003 | Matsuda | |
| 6,922,229 B2 * | 7/2005 | Yawata et al. | 349/187 |
| 6,997,769 B2 | 2/2006 | Saeki | |

FOREIGN PATENT DOCUMENTS

| | | |
|---|---|---|
| CN | 1504795 | 6/2004 |
| CN | 1808223 | 7/2004 |
| JP | 2000-147528 | 5/2000 |
| JP | 2004-191990 | 7/2004 |
| JP | 2004-233473 | 8/2004 |
| JP | 2006-201330 | 8/2006 |
| TW | I252349 | 4/2006 |

OTHER PUBLICATIONS

Taiwan Office Action dated Oct. 24, 2011.

* cited by examiner

*Primary Examiner* — Livius R Cazan
(74) *Attorney, Agent, or Firm* — KED & Associates LLP

(57) ABSTRACT

An apparatus for attaching first and second substrates of a flat display panel together includes a frame; an upper chamber fixed to an upper part of the frame and to which a first substrate can be attached and a lower chamber disposed under the upper chamber and to which a second substrate can be attached. A lifter acts to lift the lower chamber while controlling a gap between the upper chamber and the lower chamber. A position control stage interposed between the lower chamber and the lifter is used to adjust a position of the lower chamber relative to the upper chamber.

26 Claims, 17 Drawing Sheets

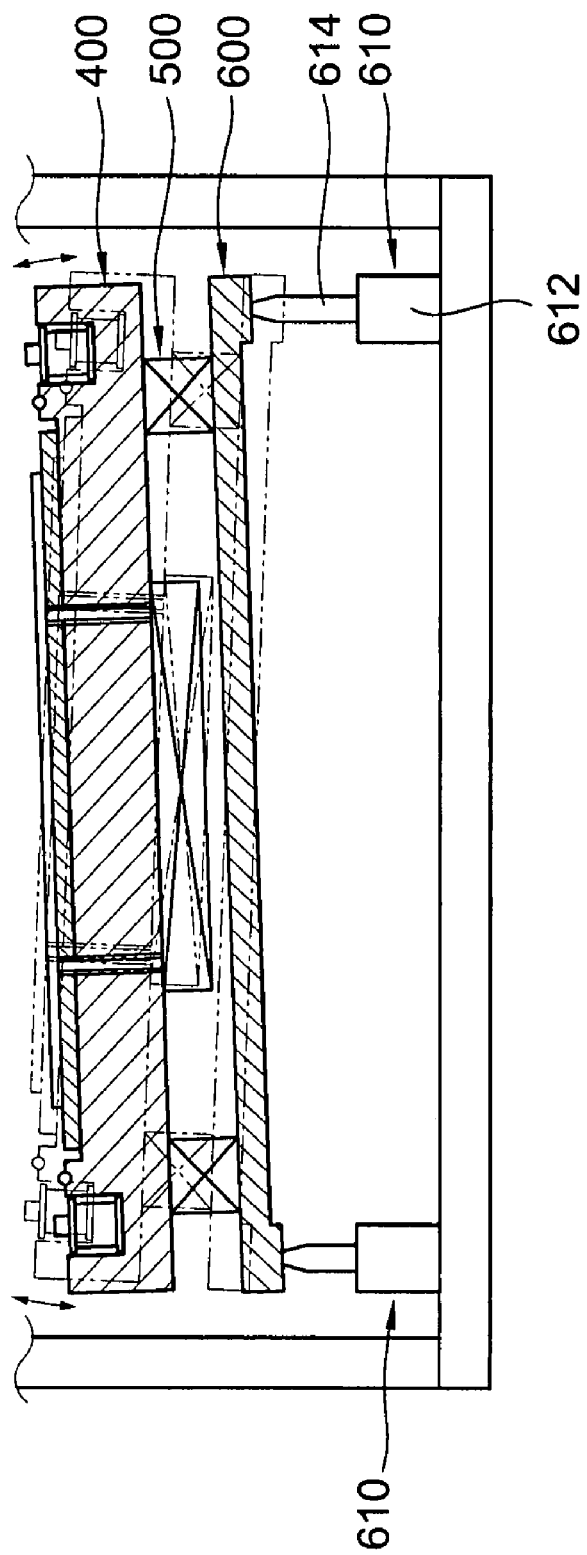

APPARATUS FOR ATTACHING SUBSTRATES OF FLAT DISPLAY PANEL

BACKGROUND

1. Field

The present invention relates to equipment for manufacturing a flat display panel, and more particularly, to an apparatus for attaching substrates of a flat display panel to one another.

2. Background

With the advancement of an information society, there has been a growing demand for various types of displays. Recently, various types of flat displays, such as liquid crystal displays (LCDs), plasma display panels (PDPs), electroluminescent displays (ELDs) and vacuum fluorescent displays (VFDs), have been developed, some of which are already widely used in real life. In particular, LCDs are widely used as portable image displays, and they are replacing cathode ray tubes (CRTs) because they are lighter and thinner, and also have higher image quality and consume less power than CRTs.

A conventional LCD is formed by injecting liquid crystals between a thin film transistor (TFT) substrate having electrodes and a color filter (CF) substrate coated with phosphors. To manufacture an LCD, after a TFT substrate and a CF substrate are fabricated separately, they must be attached to each other, and a liquid crystal material must be injected into space between the attached substrates. The process of attaching the substrates is one of the most important processes that determine the quality of the LCD. A sealer is deposited on an outer circumferential surface of each of the TFT and CF substrates to prevent leakage of liquid crystal material, and a spacer is interposed between the TFT and CF substrates to maintain a predetermined gap between them.

An apparatus for attaching substrates typically includes upper and lower chambers which can create a vacuum state therein, and such technology is disclosed in detail in Korean Patent Publication Nos. 10-2005-0004698 and 10-2005-0064139. In this apparatus, a lower chamber is fixed, and an upper chamber, which can be lowered toward the lower chamber, is installed above the lower chamber. Therefore, the gap between substrates respectively attached to the upper and lower chambers is controlled by moving the substrate attached to the upper chamber downward. Alignment of the substrates is controlled by moving the substrate attached to the lower chamber.

Each of the upper and lower chambers includes parts such as a table, a chuck stage, a chuck and an aligner. The parts are designed to prevent harm or deformation of the substrate, and they also control the alignment and gap between the substrates. The parts are coupled to one another by couplers, such as bolts included in each chamber.

However, in the apparatus having the upper and lower chambers structured as described above, particles remaining in the upper chamber may enter the lower chamber as the upper chamber is lowered toward the lower chamber, thereby deteriorating substrate quality. In addition, as the upper chamber is moved, the alignment of the upper and lower chambers, the alignment of the substrates, and the gap between the substrates are changed, which, in turn, changes an attachment environment.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings, in which like reference numerals refer to like elements, and wherein:

FIGS. 11A-11C are operation diagrams illustrating a lower chamber position control operation of the apparatus of FIG. 1;

DETAILED DESCRIPTION

Figure 1:
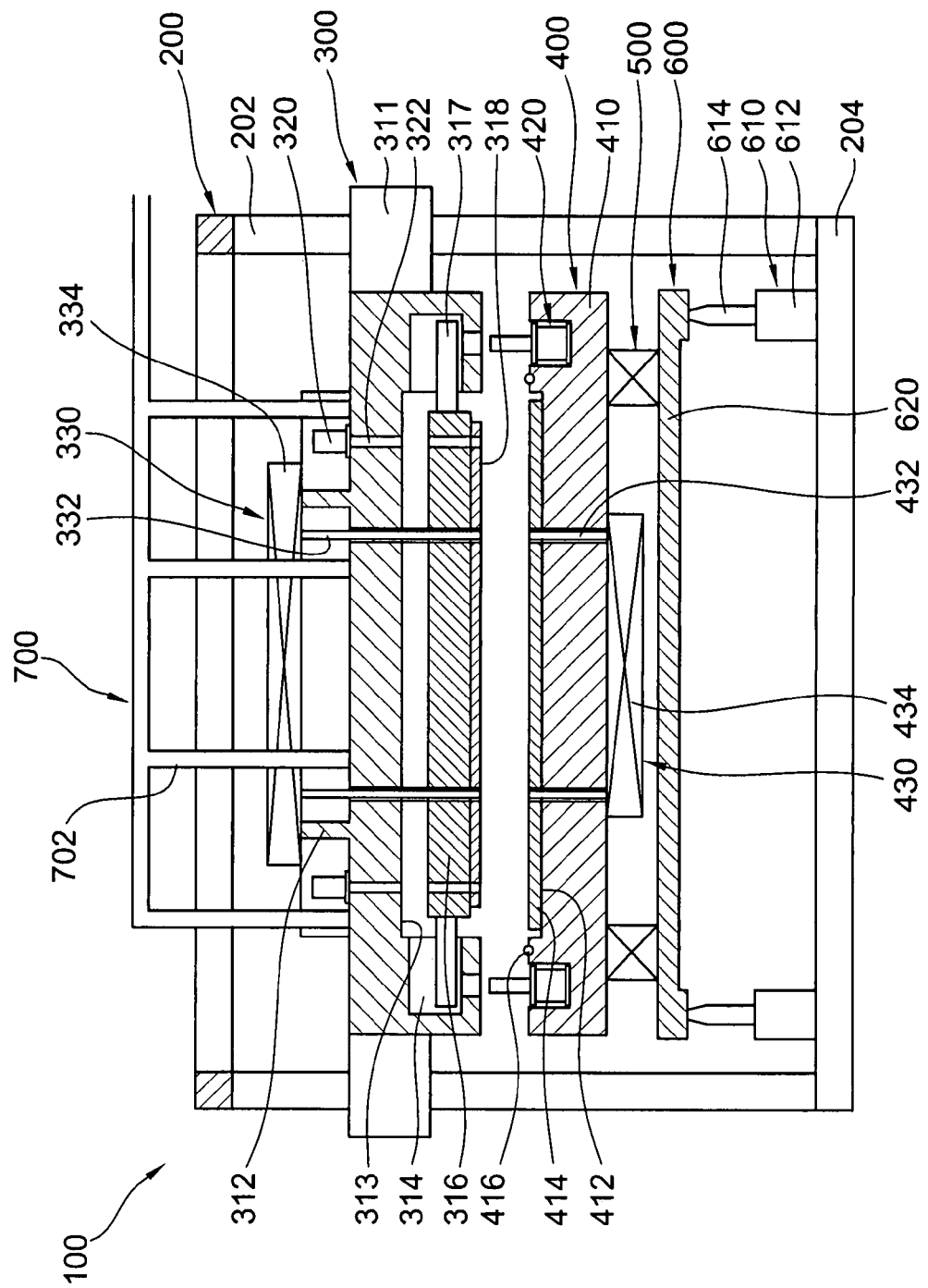
FIG. 1 is a schematic diagram illustrating an apparatus for attaching substrates of a flat display panel together.

Throughout the following description, certain terms used to refer to particular elements are defined in consideration of functions of the elements. However, the elements should not be construed as being limited by these terms and could be referred to by different terms in the art. Although the elements are indicated by reference numerals in the drawings for ease of description, they are not limited to the illustrations in the drawings.

In addition, modified embodiments may be considered as being equivalent if they share functional similarity and identity. Also, although embodiments which partially modify configurations illustrated in the drawings are employed they may be considered as being equivalent if functional similarity and identity are found between the embodiments.

Referring to FIG. 1, an apparatus 100 for attaching substrates of a flat display panel includes a frame 200, an upper chamber 300, a lower chamber 400, a lifter 600, and a position control stage 500. The frame 200 forms an exterior of the apparatus 100 and has each element of the apparatus 100, which will be described later, mounted thereon. The upper chamber 300 is fixed to an upper part of the frame 200, and a first substrate, which could be a thin film transistor (TFT) substrate or a color filter (CF) substrate, P1 is attached to the upper chamber 300. The lower chamber 400, which can be raised toward the upper chamber 300, is disposed under the upper chamber 300, and a second substrate, which would be the other of the CF substrate and the TFT substrate, P2 is attached to the lower chamber 400. The lifter 600 is installed in a lower part of the frame 200 and lifts the lower chamber 400 toward the upper chamber 300. The position control stage 500 is interposed between the lower chamber 400 and the lifter 600 and adjusts the position of the lower chamber 400.

More specifically, the frame 200 forms the exterior of the apparatus 100 and supports and fixes each element of the apparatus 100. The frame 200 includes a plurality of poles 202 to which the upper chamber 300 separated upward from the lower chamber 400 is fixed. Each of the poles 202 is fixed to an outer circumferential surface of a base 204 which forms the lower part of the frame 200 and to which the lifter 600 is fixed. Beams (not shown) and props (not shown) may be additionally installed between the poles 202 in order to reinforce the poles 202.

The upper chamber 300 is closely attached to the lower chamber 400, thereby forming an attachment space and an attachment environment. Specifically, the upper chamber 300 includes an upper chamber body 310 and an exhaust unit 700. The upper chamber body 310 is closely attached to the lower chamber 400 and thus forms the attachment space. In addition, the exhaust unit 700 is installed outside of the upper chamber body 310 and forms the attachment environment by ventilating the attachment space.

A plurality of fixing protrusions 311 are formed at outer circumferential corners of the upper chamber body 310. The fixing protrusions 311 protrude in an outward direction of the upper chamber body 310, and the poles 202 penetrate through and are fixed to the fixing protrusions 311, respectively.

Figure 2:
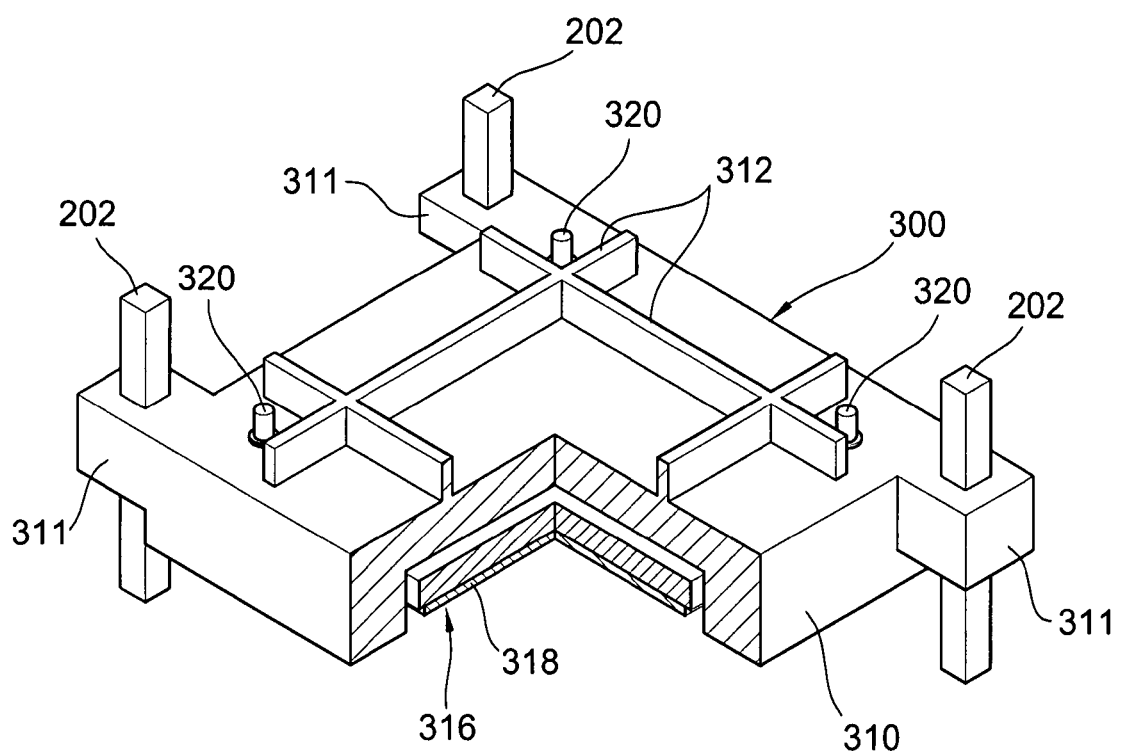
FIG. 2 is a perspective, partial cross-sectional view of an upper chamber of the apparatus of FIG. 1.

A plurality of ribs 312 are formed on a top surface of the upper chamber body 310. The ribs 312 prevent deformation of the upper chamber body 310 due to forces caused by the vacuum pressure generated during a substrate attachment process. The ribs 312 may cross each other to correspond to directions in which the upper chamber body 310 is likely to be deformed, as shown in FIG. 2.

A sunken portion 313 for creating the attachment space is formed in a bottom surface of the upper chamber body 310. An upper stage 316, to which the first substrate P1 is attached, is installed in the sunken portion 313. The upper stage 316 includes an upper chuck 318 for holding the first substrate P1. The upper chuck 318 may be an electrostatic chuck which holds the first substrate P1 by an electrostatic force, or some other type of device which can be used to hold the first substrate P1 on the upper stage 316.

Figure 3:
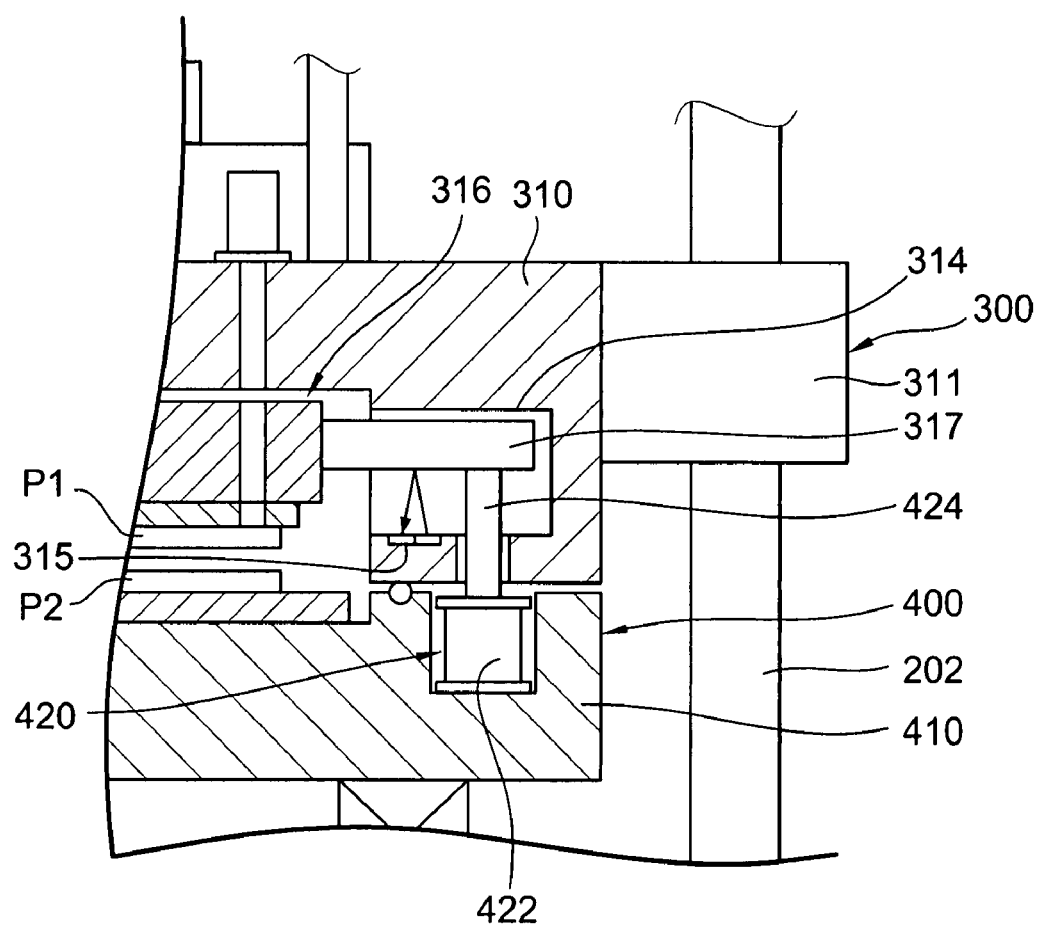
FIG. 3 is a cross-sectional diagram illustrating a gap controller included in the apparatus of FIG. 1.
Figure 4:
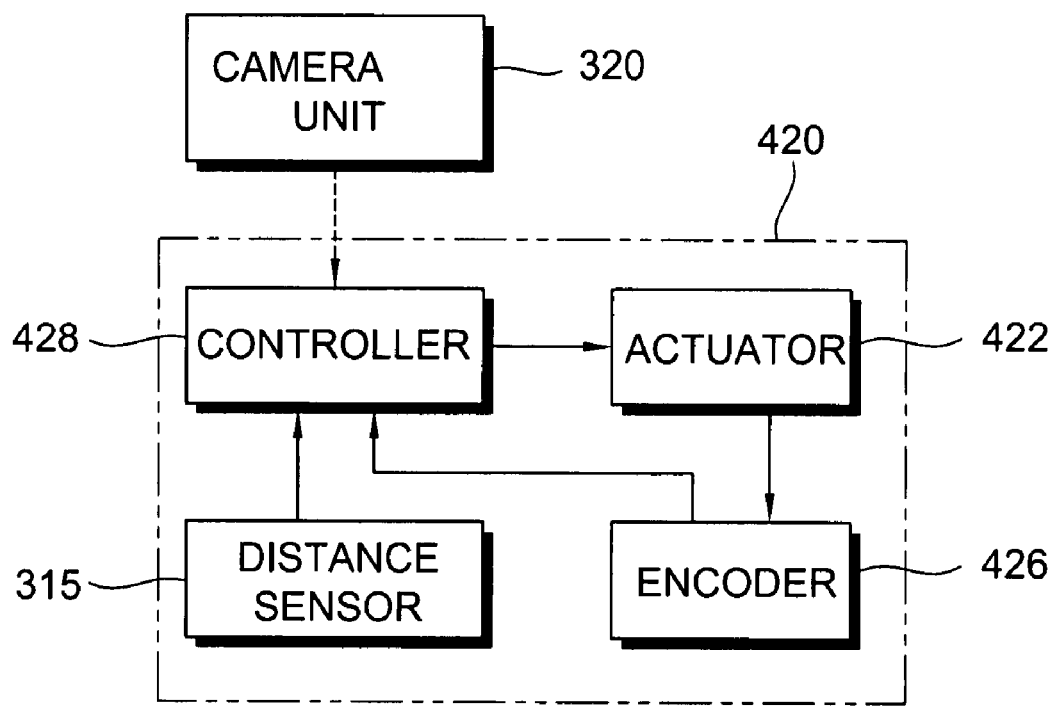
FIG. 4 is a block diagram illustrating the configuration of the gap controller of FIG. 3.
Figure 5:
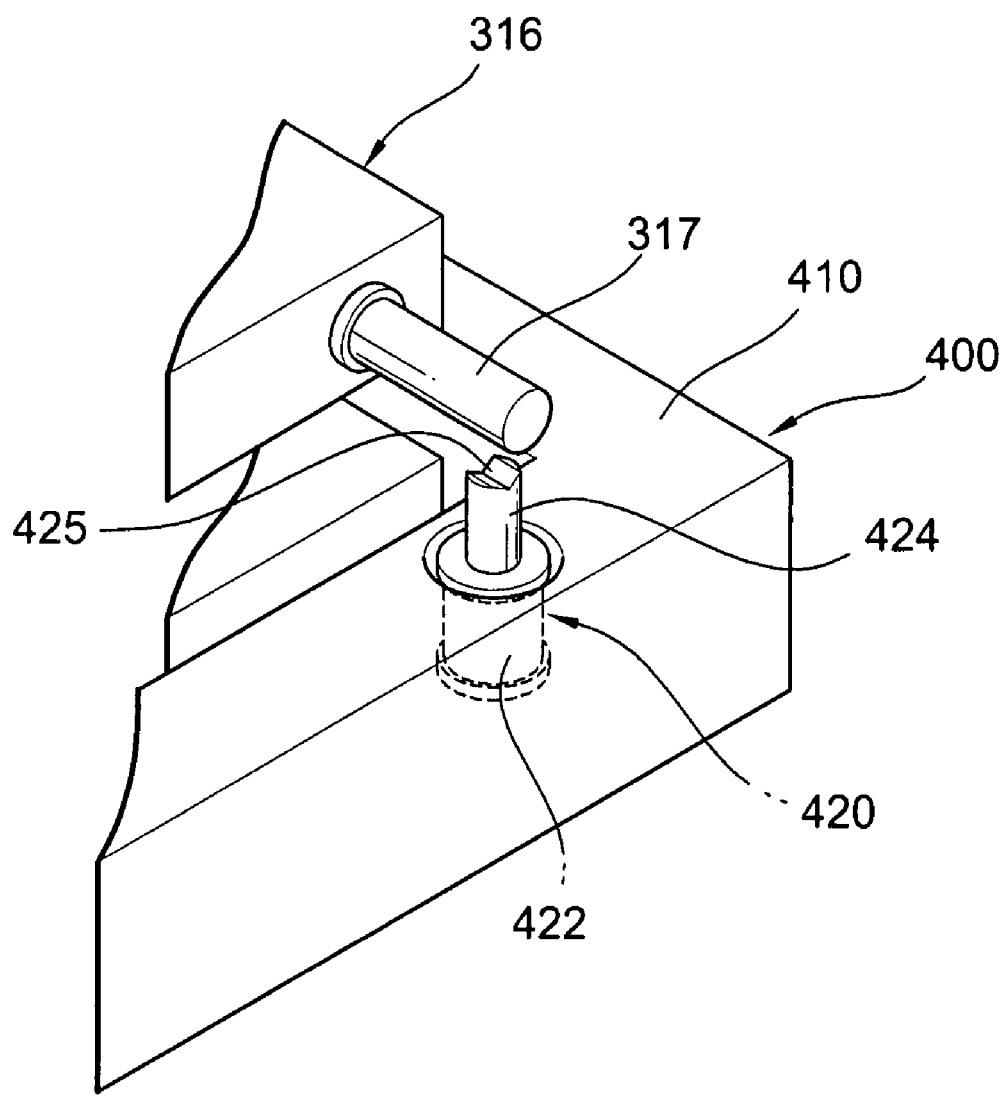
FIG. 5 is a perspective view of the gap controller of FIG. 3.
Figure 6:
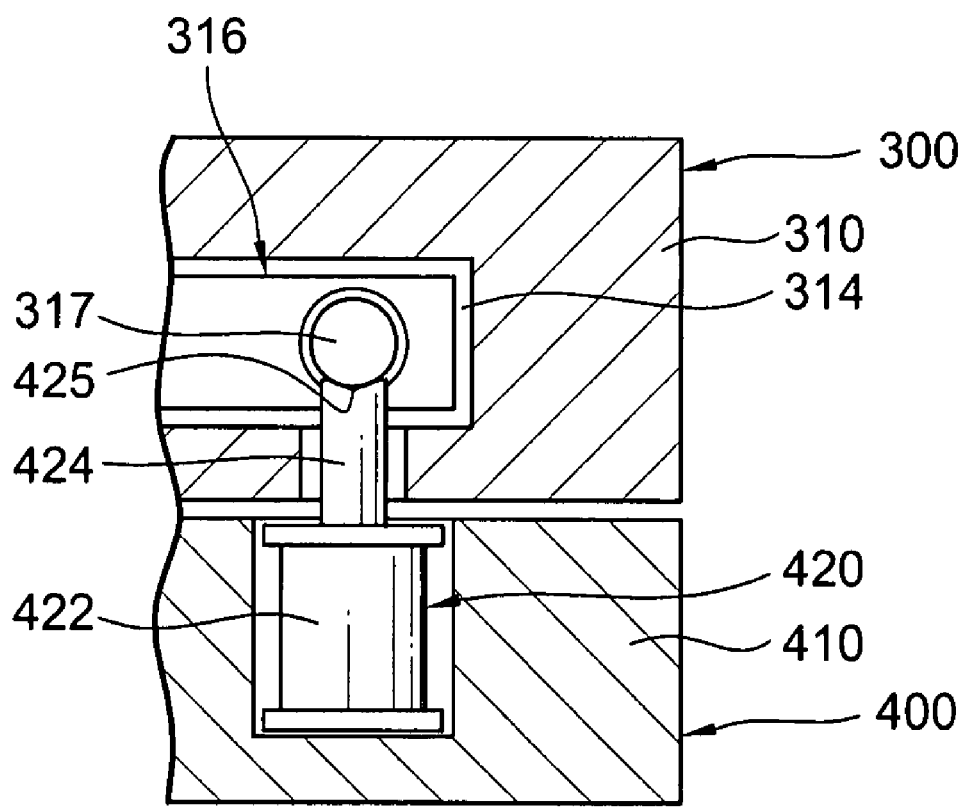
FIG. 6 is a partial cross-sectional view of the gap controller of FIG. 3.

A support bar 317 protrudes from each outer end of the upper stage 316 and extends inwardly of the sunken portion 313. The support bar 317 is supported by a gap controller 420 of the lower chamber 400, which will be described later. The support bar 317 may have a cylindrical shape. An insertion space 314 is defined by an inner circumferential surface of the sunken portion 313. The support bar 317 is inserted into and moved within the insertion space 314. In the insertion space 314, a distance sensor 315 (see FIG. 3) senses the exact position of the support bar 317 within the insertion space. The distance sensor 315 operates in combination with the gap controller 420, which will be described later, and thus limits the operation of the gap controller 420.

In the embodiment illustrated in the Figures, the distance sensor 315 senses the distance traveled by the support bar 317. However, important thing is to know the position of the upper substrate P1, which is attached to the support bar 317. Thus, in other embodiments, the distance sensor 315 may also sense the distance traveled by some other portion of the apparatus to which the first substrate P1 is attached, or the first substrate P1 itself.

Camera units 320 and a substrate separation device 330 are installed on an outer circumference of the top surface of the upper chamber body 310. The camera units 320 control relative positions of the first and second substrates P1 and P2. The substrate separation device 330 sucks or pressurizes the first substrate P1 in order to attach or separate the first substrate P1 to/from the upper stage 316.

Specifically, each camera unit 320 observes an alignment state of the first substrate P1, which is attached to the upper chuck 318 of the upper stage 316, and the second substrate P2, which will be described later, through a penetration hole 322 formed in the upper chamber body 310 and the upper stage 316. The camera unit 320 may observe overlapping alignment marks (not shown) on the first and second substrates P1 and P2 or may observe two or more overlapping corners, which are diagonal to each other, of the first and second substrates P1 and P2.

The substrate separation device 330 includes a plurality of separation pins 332 which penetrate through the upper chamber body 310 and the upper stage 316 and a separation pin operator 334 which is installed outside of the upper chamber body 310 and which raises and lowers the separation pins 332. The separation pins 332 are shaped like a tube having a through-hole, and they are connected to the exhaust unit 700 which will be described later. If vacuum pressure is formed inside the separation pins 332 by the exhaust unit 700, the separation pins 332 suck the first substrate P1.

The exhaust unit 700 generates vacuum pressure in the attachment space formed by the sunken portion 313 of the upper chamber body 310 and the lower chamber 400 which will be described later. The exhaust unit 700 includes exhaust pipes 702 connected to the attachment space which is formed by the upper chamber body 310 and a lower chamber body 410 and a vacuum pump (not shown) which generates vacuum pressure in the attachment space through the exhaust pipes 702.

Since the exhaust pipes 702 are connected to the vacuum pump for generating vacuum pressure in the attachment space, they are used to generate vacuum pressure. However, the exhaust pipes 702 may also be used to supply $N_2$ processing gas required in the substrate attachment process or supply pressurized gas in order to put the attachment space in an atmospheric pressure state.

The lower chamber 400 is closely attached to the upper chamber body 310 to form the attachment space. As the lower chamber 400 ascends toward the upper chamber 300, the alignment of the lower chamber 400 and the upper chamber 300 is controlled. The lower chamber 400 includes the lower chamber body 410 installed in the lower part of the frame 200 and the position control stage 500 disposed under the lower chamber body 410 and supported by the lifter 600 which will be described later.

A lower stage 412 is installed on a top surface of the lower chamber body 410 to which the second substrate P2 is attached. The lower stage 412 includes a lower chuck 414 for holding the second substrate P2. The lower chuck 414 may be an electrostatic chuck which holds the second substrate P2 by an electrostatic force, or some other type of chuck mechanism capable of holding the second substrate on the lower chuck 414 surface.

A sealing member 416 is installed on an outer circumferential surface of the lower stage 412. The sealing member 416 contacts the bottom surface of the upper chamber body 310. In alternative embodiments, the sealing member 416 may be formed on the upper chamber body 310, or sealing members may be formed on both the upper and lower chamber bodies.

The gap controller 420 is installed on an outer circumferential surface of the lower chamber body 410. The gap controller 420 penetrates through the upper chamber body 310 to support the support bar 317 which protrudes from the upper stage 316.

The gap controller 420 will now be described with reference to FIGS. 3 through 6. The gap controller 420 includes a mechanism at locations corresponding to each support bar. In other words, multiple devices are mounted on the lower chamber body 410. Each gap controller 420 includes an actuator 422, a supporter 424, an encoder 426, and a controller 428. The actuator 422 slides up or down in order to move the support bar 317 upward or downward. The supporter 424 supports the support bar 317 and is moved by the actuator 422. The encoder 426 senses an amount of movement of the actuator 422. The controller 428 controls an amount of movement of the actuator 422 by comparing the amount of movement of the actuator 422 sensed by the encoder 422 to that of the support bar 317 sensed by the distance sensor 315 of the upper chamber body 310.

The controller 428 may compare the actual distance traveled by each of the first and second substrates P1 and P2 to the distance traveled by the actuator 422 based on focusing information provided by the camera unit 320 described above, as well as values provided by the encoder 426 and the distance sensor 315.

An end of the supporter 424 has a "V"-shaped notch 425. The notch 425 has a hollow in a lengthwise direction of the support bar 317 so that part of an outer circumferential surface of the support bar 317 of the upper stage 316 can rest in the hollow. Although the notch 425 described above has the "V" shape, the shape of the notch 425 is not limited thereto. For example, the notch 425 may have a "U" shape.

A substrate elevator 430 is installed on a bottom surface of the lower chamber body 410. The substrate elevator 430 attaches the second substrate P2 to the lower stage 412 or separates the second substrate P2 from the lower stage 412. The substrate elevator 430 includes a plurality of elevation pins 432 which penetrate through the lower chamber body 410 and an elevation pin operator 434 which is installed outside the lower chamber body 410 and raises the elevation pins 432.

Figure 7:
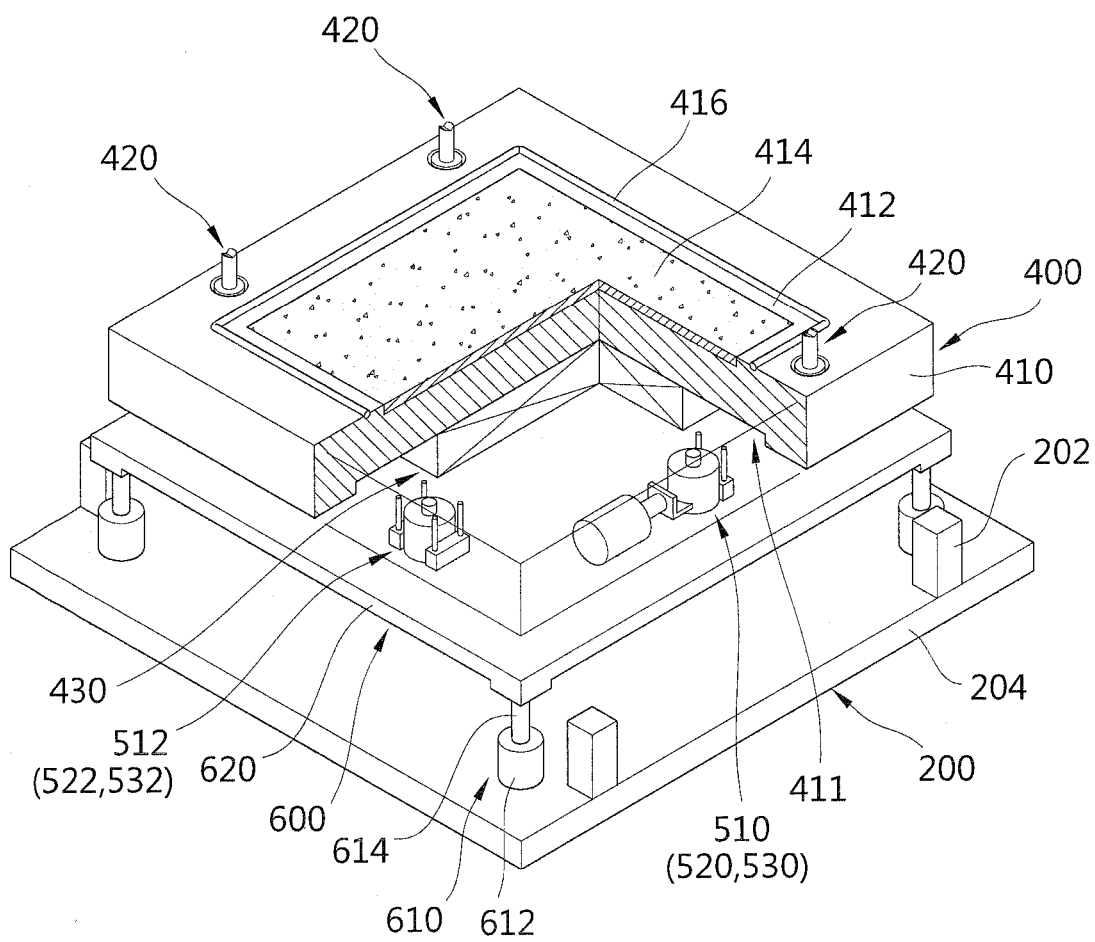
FIG. 7 is a perspective, partial cross-sectional view of a lower chamber and a position control stage included in the apparatus of FIG. 1.

The position control stage 500 is installed in a mounting groove 411 formed on the bottom surface of the lower chamber body 410, as shown in FIG. 7. The position control stage 500 is supported by the lifter 600, and adjusts the position of the lower chamber body 410, and aligns the upper chamber body 310 with the lower chamber body 410.

Figure 8:
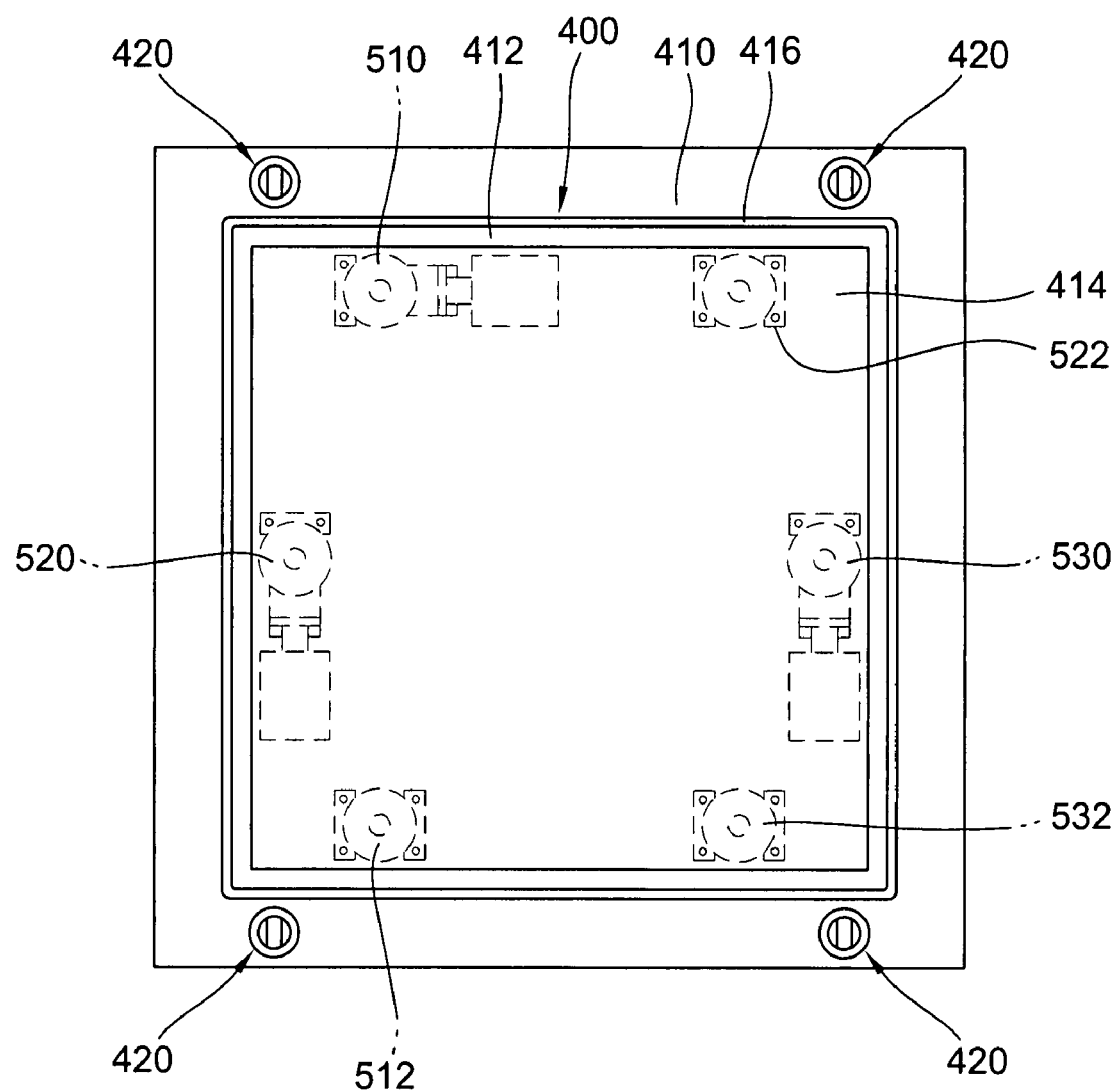
FIG. 8 is a plan view of the lower chamber and the position control stage of FIG. 7.

The position control stage 500 will now be described with reference to FIGS. 7 and 8. The position control stage 500 moves the lower chamber body 410 in an x-axis direction and a y-axis direction of the lower chamber body 410 with respect to the upper chamber body 310 and, at the same time, rotates the lower chamber body 410 about an θ axis. The position control stage 500 includes an x-axis transferring unit 510, which moves the lower chamber body 410 in the x-axis direction, and an x-axis idle unit 512. In addition, the position control stage 500 includes a y-axis transferring unit 520 and a θ-axis transferring unit 530, which move the lower chamber body 410 in the y-axis direction and, at the same time, rotate the lower chamber body 410 about the θ axis.

Here, the x-axis transferring unit 510, the y-axis transferring unit 520, and the θ-axis transferring unit 530 are distinguished according to a direction in which the lower chamber body 410 is moved (or rotated). Each of the x-axis transferring unit 510, the y-axis transferring unit 520, and the θ-axis transferring unit 530 includes a driving motor (not shown), a ball screw (not shown), and a linear guide (not shown). The driving motor generates power, and the ball screw converts a rotary motion of the driving motor into a linear motion. The linear guide (not shown) guides the linear motion of the ball screw and, at the same time, delivers the linear power to the lower chamber body 410.

In alternate embodiments, the driving motors and ball screw units could be replaced with linear motors, or with vacuum units to provide the desired movements in the x, y and θ directions.

The x-axis idle unit 512, the y-axis idle unit 522, and the θ-axis rotation unit 532 are implemented to assist the motions of the x-axis transferring unit 510, the y-axis transferring unit 520, and the θ-axis transferring unit 530, respectively.

A state in which the x-axis transferring unit 510, the y-axis transferring unit 520, the θ-axis transferring unit 530, the x-axis idle unit 512, the y-axis idle unit 522, and the θ-axis rotation unit 532 are installed will now be briefly described. The x-axis transferring unit 510 is installed at the bottom surface of the lower chamber body 410 in a direction parallel to the x-axis direction of the lower chamber body 410. In addition, the y-axis transferring unit 520 and the θ-axis transferring unit 530 are installed opposite each other in a direction orthogonal to the x-axis transferring unit 510. The x-axis idle unit 512 is installed opposite the x-axis transferring unit 510, and the y-axis idle unit 522 and the θ-axis rotation unit 532 are installed orthogonal to the y-axis transferring unit 520 and the θ-axis transferring unit 530, respectively.

Movement of the lower chamber body 410 in the x-axis direction is controlled by the x-axis transferring unit 510 and the x-axis idle unit 512. Movement of the lower chamber body 410 in the y-axis direction is controlled by the y-axis transferring unit 520, and the y-axis idle unit 522. In addition, rotation of the lower chamber body 410 about the θ axis is controlled by the combined operation of the y-axis transferring unit 520, the θ-axis transferring unit 530, the y-axis idle unit 522, and the θ-axis rotation unit 532.

The lifter 600 lifts the lower chamber 400 toward the upper chamber 300 so that the attachment space is formed between the lower chamber 400 and the upper chamber 300. The lifter 600 includes a plurality of elevation devices 610 installed on the outer circumferential surface of the base 204 of the frame 200 and an elevation plate 620 supported by the elevation devices 610. The elevation plate 620 is larger than the lower chamber body 410 and has a square or rectangular shape. A plurality of elevation supports (not shown) supported by the elevation devices 610 are formed at corners of a bottom surface of the elevation plate 620. The elevation devices 610 correspond to locations of the elevation supports which are formed on the bottom surface of the elevation plate 620 and between the base 204 and the elevation plate 620. Each of the elevation devices 610 includes an elevation pole 614 supporting the elevation plate 620 and an elevator 612 elevating the elevation pole 614.

The elevator 612 may be implemented as a hydraulic cylinder (not shown) generating power that is used to directly elevate the elevation plate 620. Alternatively, the elevator 612 may be implemented as a combination of a motor (not shown), a decelerator (not shown) changing the direction of power generated by the motor and slowing down the motor, and a screw coupler (not shown) converting a rotary motion of the decelerator into a linear motion. The structure of the elevator 612 may vary according to various embodiments of the present invention and is not limited to the above example.

Figure 9:
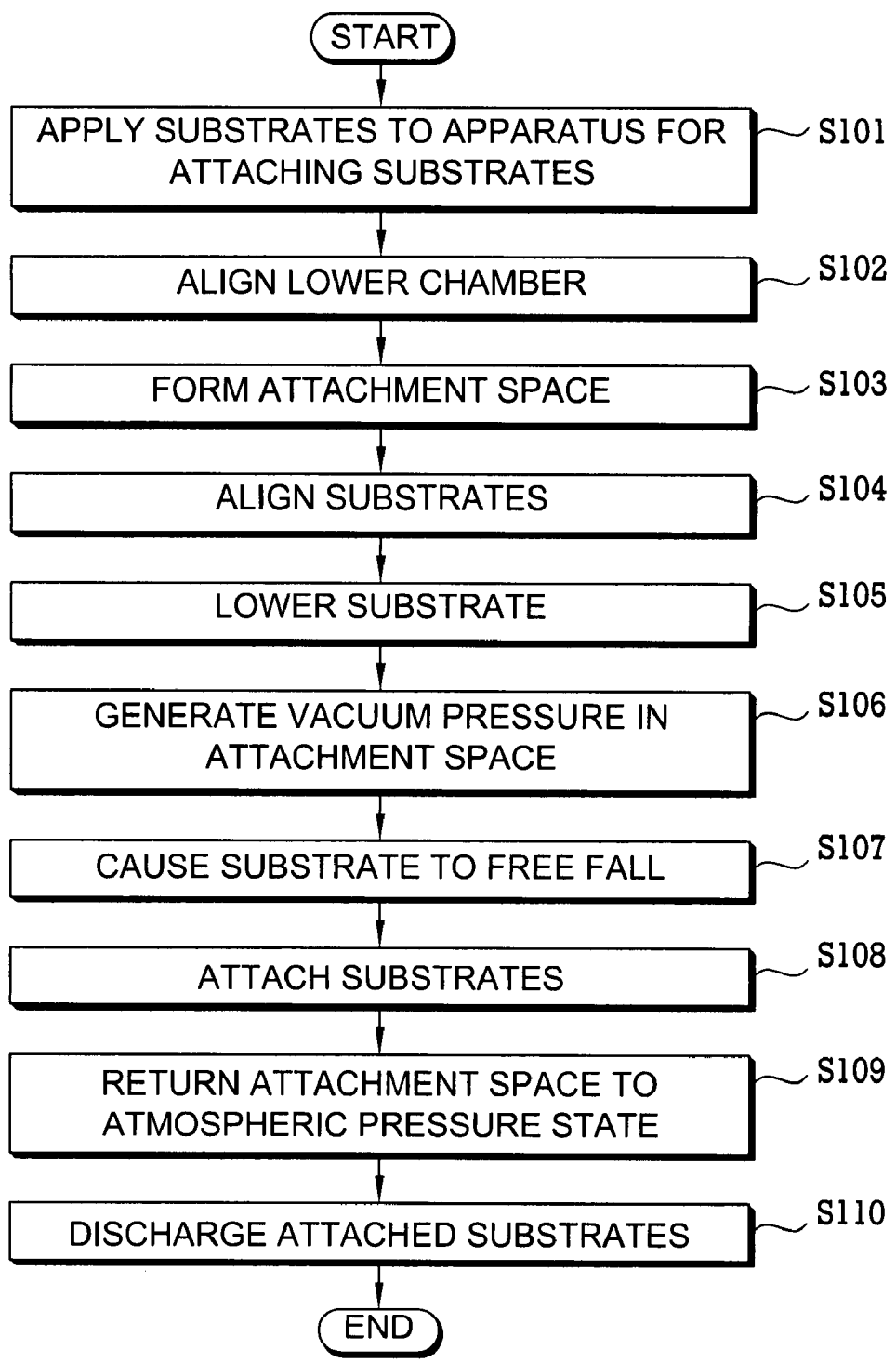
FIG. 9 is a flowchart illustrating the operation of the apparatus of FIG. 1.
Figure 10:
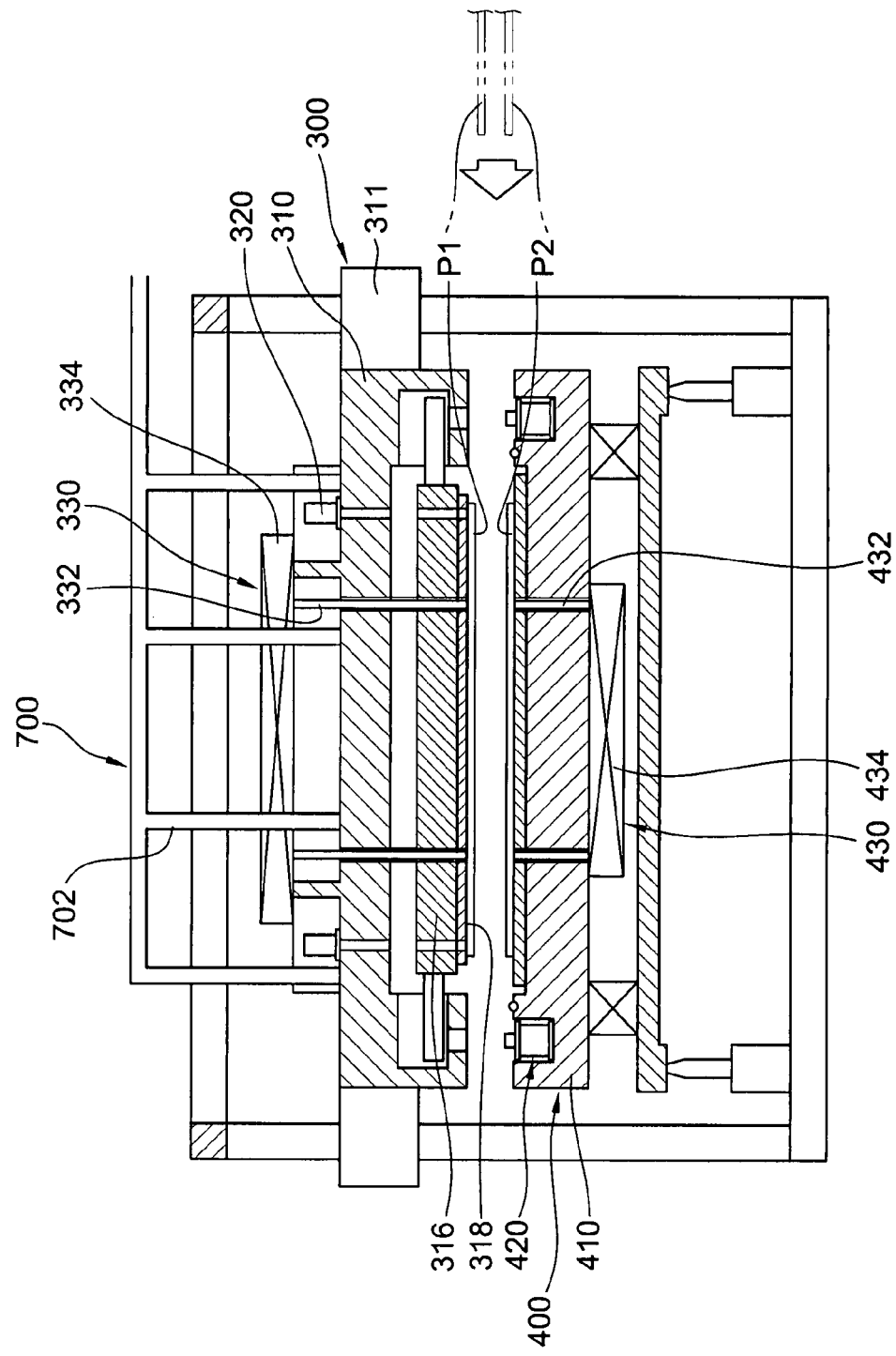
FIG. 10 is an operation diagram illustrating a substrate insertion operation of the apparatus of FIG. 1.

Hereafter, the operation of the apparatus 100 according to an exemplary embodiment of the present invention will be described in detail. Each element of the apparatus 100 mentioned below should be understood based on the above descriptions and drawings. FIG. 9 is a flowchart illustrating the operation of the apparatus 100 of FIG. 1.

Referring to FIG. 9, the first and second substrates P1 and P2 are supplied between the open upper and lower chambers 300 and 400 of the apparatus 100 by a substrate supplier (not shown) (S101). The first substrate P1 would be supplied first, and as the first substrate P1 is advanced between the upper chamber 300 and the lower chamber 400, it is attached to the upper chuck 318 of the upper stage 316 of the upper chamber body 310. This is done by lowering the separation pins 332 with the separation pin operator 334 and then applying a vacuum pressure to the separation pins with the exhaust unit 700 so that the first substrate P1 is sucked to the separation pins 332. In this state, the first substrate P1 may be moved upward on the separation pins 332 to the upper stage 316 and the first substrate P1 is then attached to the upper chuck 318.

When the second substrate P2 is supplied, the elevation pins 432 of the lower chamber body 410 are elevated above the lower chamber body 410 by the elevation pin operator 434, and the second substrate P2 between the upper chamber 300 and the lower chamber 400 is supported by the ascending elevation pins 432. As the elevation pin operator 434 lowers the elevation pins 432, the second substrate P2 supported by the elevation pins 432 is also lowered. Then, the second substrate P2 is attached to the lower chamber body 410 by the holding force of the lower chuck 414 of the lower stage 412 under the second substrate P2.

Figure 11A:
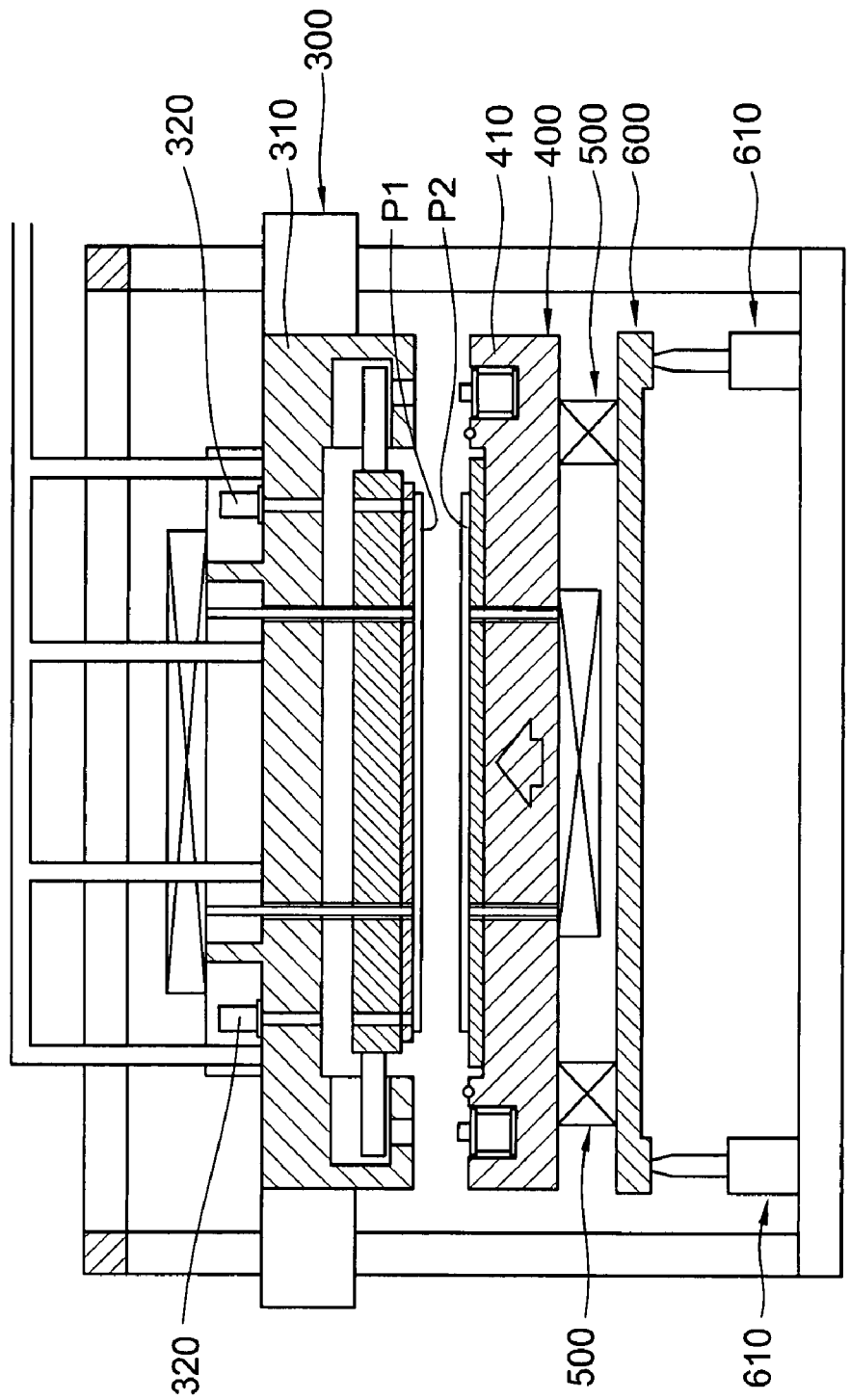

Referring to FIG. 11A, after the first and second substrates P1 and P2 are attached to the upper chamber body 310 and the lower chamber body 410, respectively, the lower chamber 400 is aligned with the upper chamber 300 as it is moved toward the upper chamber 300 by the lifter 600 while the position of the lower chamber 400 is controlled by the position control stage 500 disposed between the lower chamber body 410 and the lifter 600 (S102). The position of the lower chamber body 410 relative to the upper chamber body 310 is determined based on the positions of alignment marks located on the first and second substrates P1 and P2, which are observed by the camera units 320 of the upper chamber body 310. Since the operation of the camera units 320 is a well-known technology, a detailed description thereof will be omitted.

Figure 11C:
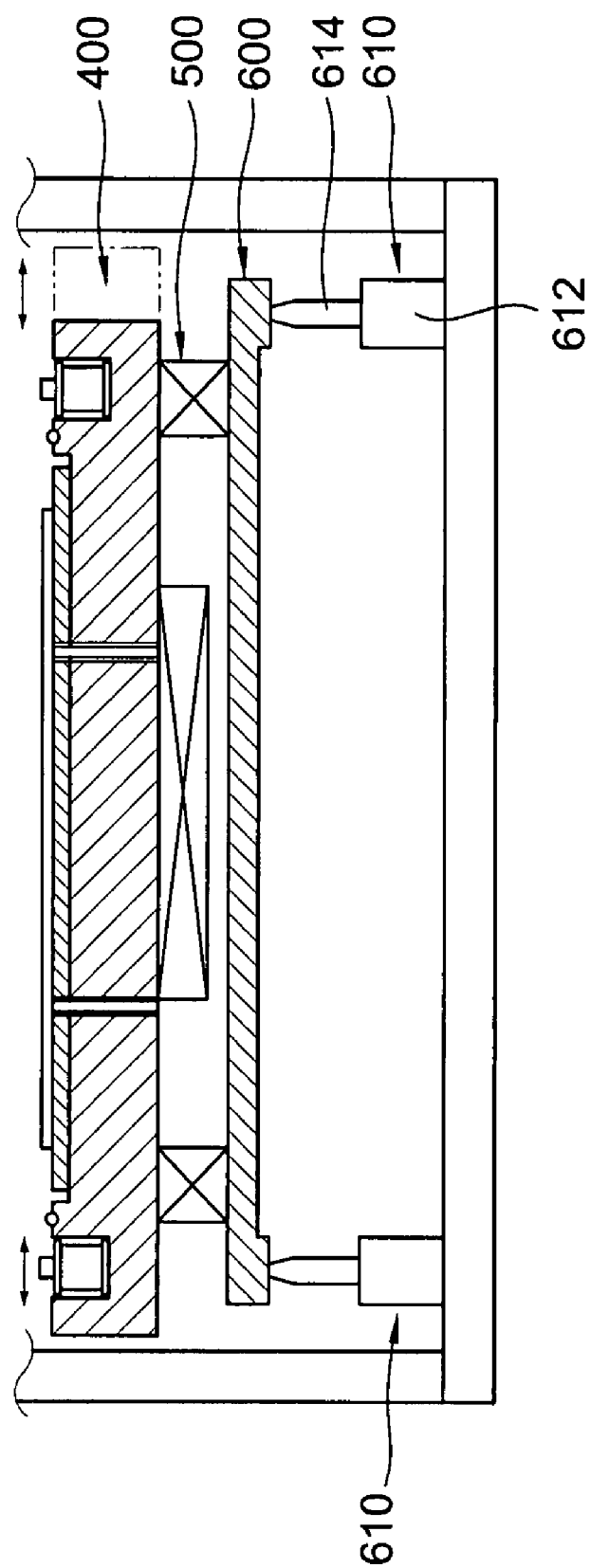

Referring to FIGS. 11B and 11C, the lifter 600 lifts the lower chamber body 410 toward the upper chamber body 310 while the position of the lower chamber body 410 with respect to the upper chamber body 310 is controlled. The elevation plate 620 on which the lower chamber body 410 is mounted is supported by the elevation devices 610, which can operate independently. The elevator 612 of each of the elevation devices 610 is operated independently, and the elevation poles 614, which are elevated by the elevators 612, control a vertical position of the elevation plate 620. As a horizontal position of the lower chamber body 410 supported by the elevation plate 620 is changed, a vertical alignment of the lower chamber body 410 and the upper chamber body 310 is adjusted (see FIG. 11B).

In addition, as the lower chamber body 410 is lifted by the lifter 600, a horizontal alignment of the lower chamber body 410 and the upper chamber body 310 is adjusted by the position control stage 500 disposed between the lower chamber body 410 and the elevation plate 620 of the lifter 600. The x-axis transferring unit 510 and the x-axis idle unit 512 of the position control stage 500 move the lower chamber body 410 in the x-axis direction, and the y-axis transferring unit 520, the θ-axis transferring unit 530, the y-axis idle unit 522, and the θ-axis rotation unit 532 move the lower chamber body 410 in the y-axis direction. As the lower chamber body 410 is rotated about the θ axis by the combined movement of the x-axis transferring unit 510, the y-axis transferring unit 520, the θ-axis transferring unit 530, the x-axis idle unit 512, the y-axis idle unit 522 and the θ-axis rotation unit 532, the upper chamber body 310 and the lower chamber body 410 are aligned horizontally (see FIG. 11C).

After the lower chamber body 410 and the upper chamber body 310 are aligned with each other, the top surface of the lower chamber body 410 is closely attached to the bottom surface of the upper chamber body 310, thereby forming an attachment space between the first substrate P1 and the second substrate P2 (S103). The upper chamber body 310 is attached airtight to the lower chamber body 410 by the sealing member 416 installed on the top surface of the lower chamber body 410.

Figure 12:
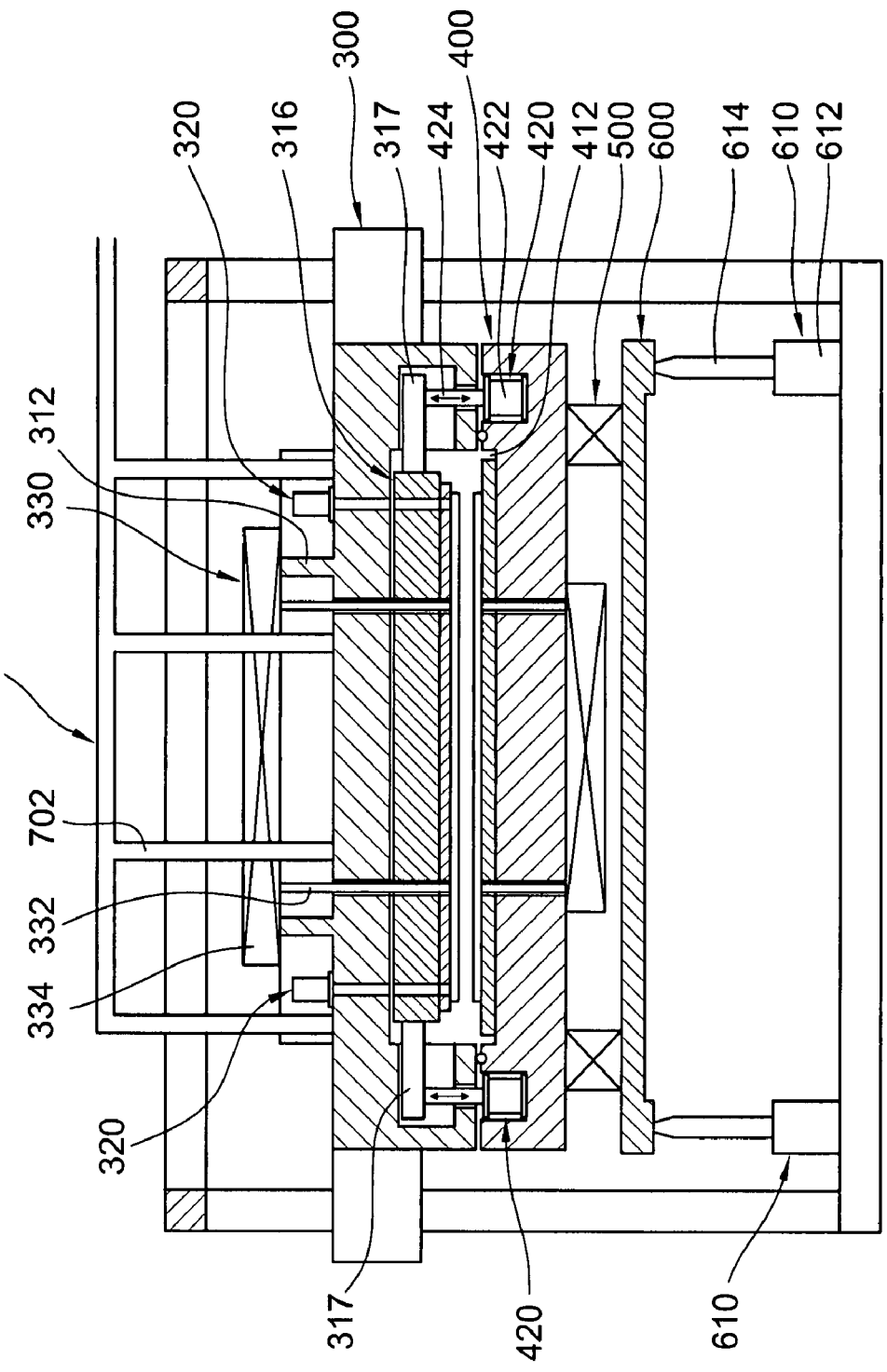
FIG. 12 is an operation diagram illustrating a substrate position control operation of the gap controller included in the apparatus of FIG. 1.

After the attachment space is formed, the gap controller 420 controls the gap between the first and second substrates P1 and P2 attached to the upper and lower chambers 300 and 400, respectively, as illustrated in FIG. 12 and the flowchart shown in 13 (S104).

Figure 13:
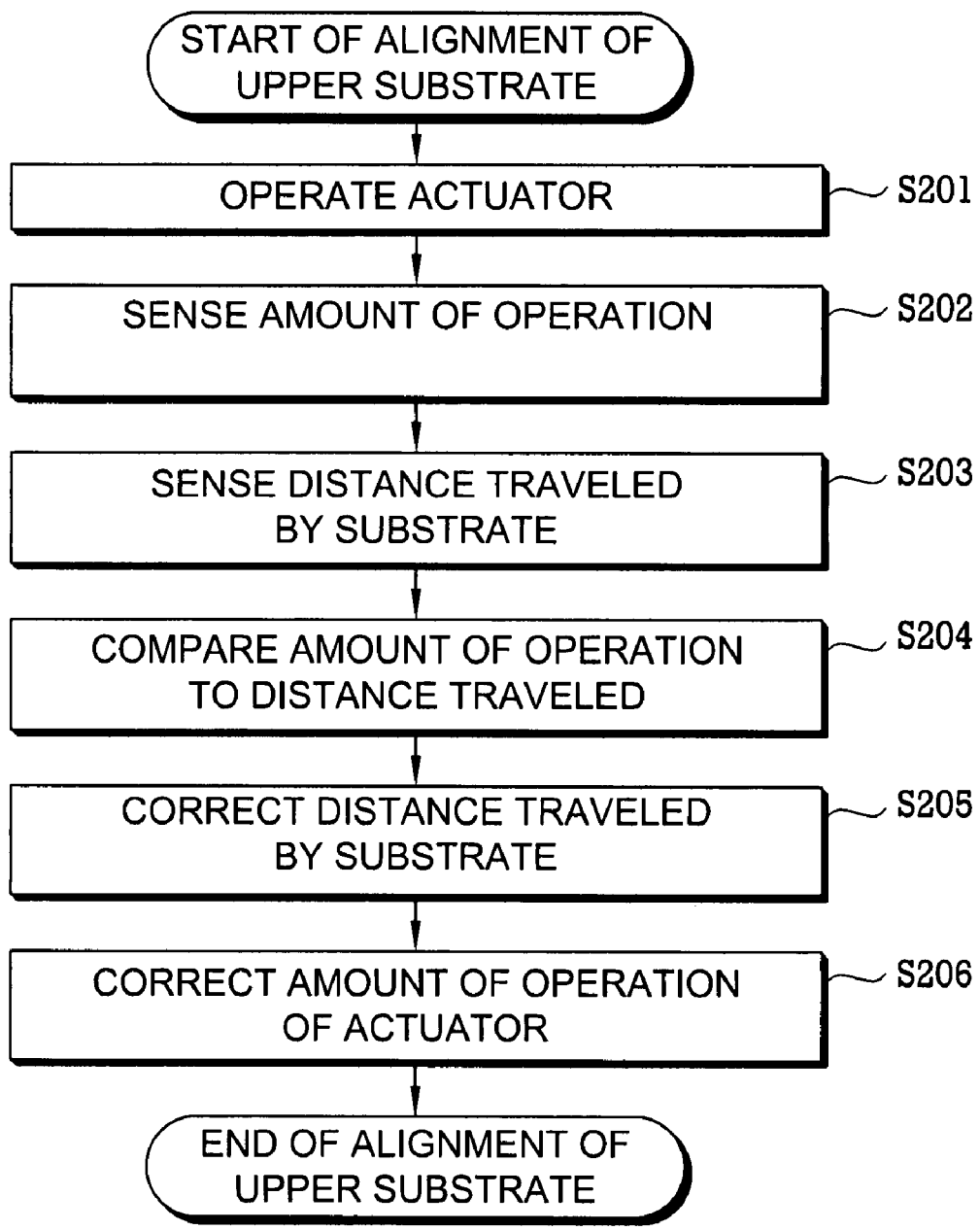
FIG. 13 is a flowchart illustrating the substrate position control operation of the gap controller included in the apparatus of FIG. 1.
Figure 14:
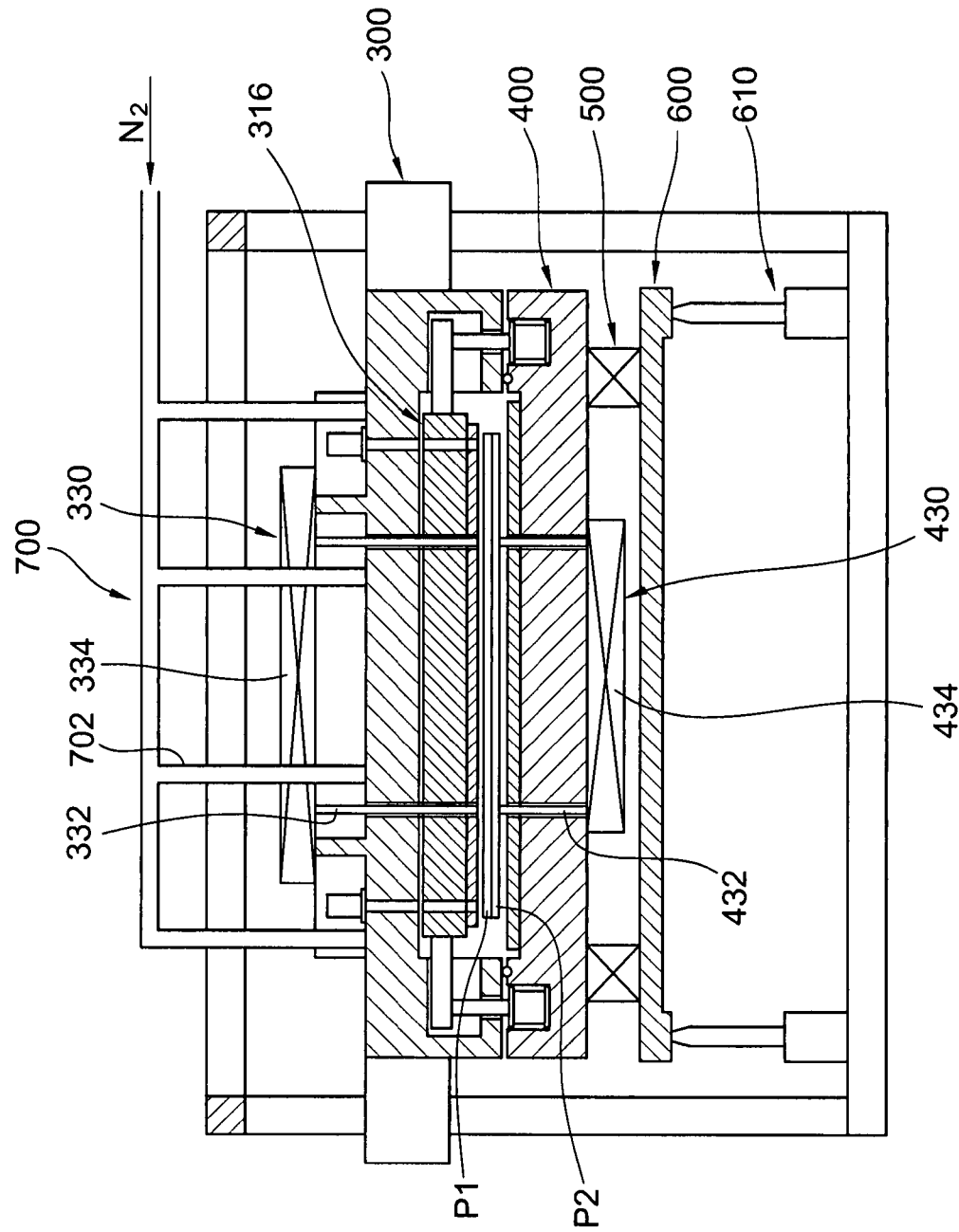
FIG. 14 is an operation diagram of a substrate attachment operation of the apparatus of FIG. 1.

Referring to FIGS. 12 and 13, the gap controller 420 senses the gap between the first and second substrates P1 and P2 in real time while adjusting the gap and alignment between the first and second substrates P1 and P2 based on information regarding the sensed gap. Referring to FIG. 12, if the actuator 422 of the gap controller 420 is operated to raise or lower the upper stage 316 in order to control the gap between the first and second substrates P1 and P2, it raises or lowers the upper stage 316 to which the first substrate P1 is attached (S201). As the actuator 422 operates, the encoder 426 of the actuator 422 senses an amount of operation of the actuator 422 (S202) while the distance sensor 315 measures the distance traveled by the upper stage 316 or the support bar 317 of the upper stage 316 and thus senses the distance traveled by the first substrate P1 attached to the upper stage 316 (S203).

The controller 428 compares the amount of operation sensed by the encoder 426 and the distance measured by the distance sensor 315 (S204). A distance value obtained from focusing information of the alignment marks photographed by the camera unit 320, which is installed to align the first and second substrates P1 and P2, is used to correct an error caused by the movement of the first substrate P1 (S205). Using an error value calculated, the controller 428 corrects the amount of operation of the actuator 422, thereby maintaining constant the gap between the first substrate P1, which is raised or lowered by the upper stage 316, and the second substrate P2 which is attached to the lower stage 412 (S206).

As described above, if the alignment of the first and second substrates P1 and P2 is completed, the upper stage 316 is lowered toward the lower stage 412 by the actuator 422 of the gap controller 420 which supports the upper stage 316 (S105). In this case, the upper stage 316 is lowered while being controlled by the gap controller 420 to maintain a constant gap between the first substrate P1 attached to the upper stage 316 and the second substrate P2 attached to the lower stage 412.

If a predetermined distance is maintained between the first substrate P1 of the upper stage 316 and the second substrate P2 of the lower stage 412, the lowering of the upper stage 316 is stopped, and vacuum pressure is generated in the attachment space formed by the upper chamber 300 and the lower chamber 400 (S106). In the process of generating the vacuum pressure in the attachment space, the gap controller 420 may also maintain the gap between the first and second substrates P1 and P2 constant. Since the ribs 312 are formed on the top surface of the upper chamber body 310, the upper chamber body 310 can be prevented from being deformed by the vacuum pressure which is generated as the attachment space becomes a vacuum state.

After the vacuum pressure is generated in the attachment space, the first substrate P1 attached to the upper stage 316 is made to free fall onto the second substrate P2 attached to the lower stage 412, thereby pre-joining the first and second substrates P1 and P2 (S107).

Then, pressure is applied to outside of the pre-joined first and second substrates P1 and P2 by supplying $N_2$ gas thereto, so that the first and second substrates P1 and P2 are firmly attached to each other (S108). That is, the pressure in the attachment space is increased by injecting a gas, preferably nitrogen gas, so that the first and second substrates P1 and P2 are pushed against each other by the pressure difference between a sealed space between the first and second substrates and the space surrounding the outside of the pre-joined first and second substrates P1 and P2.

Figure 15:
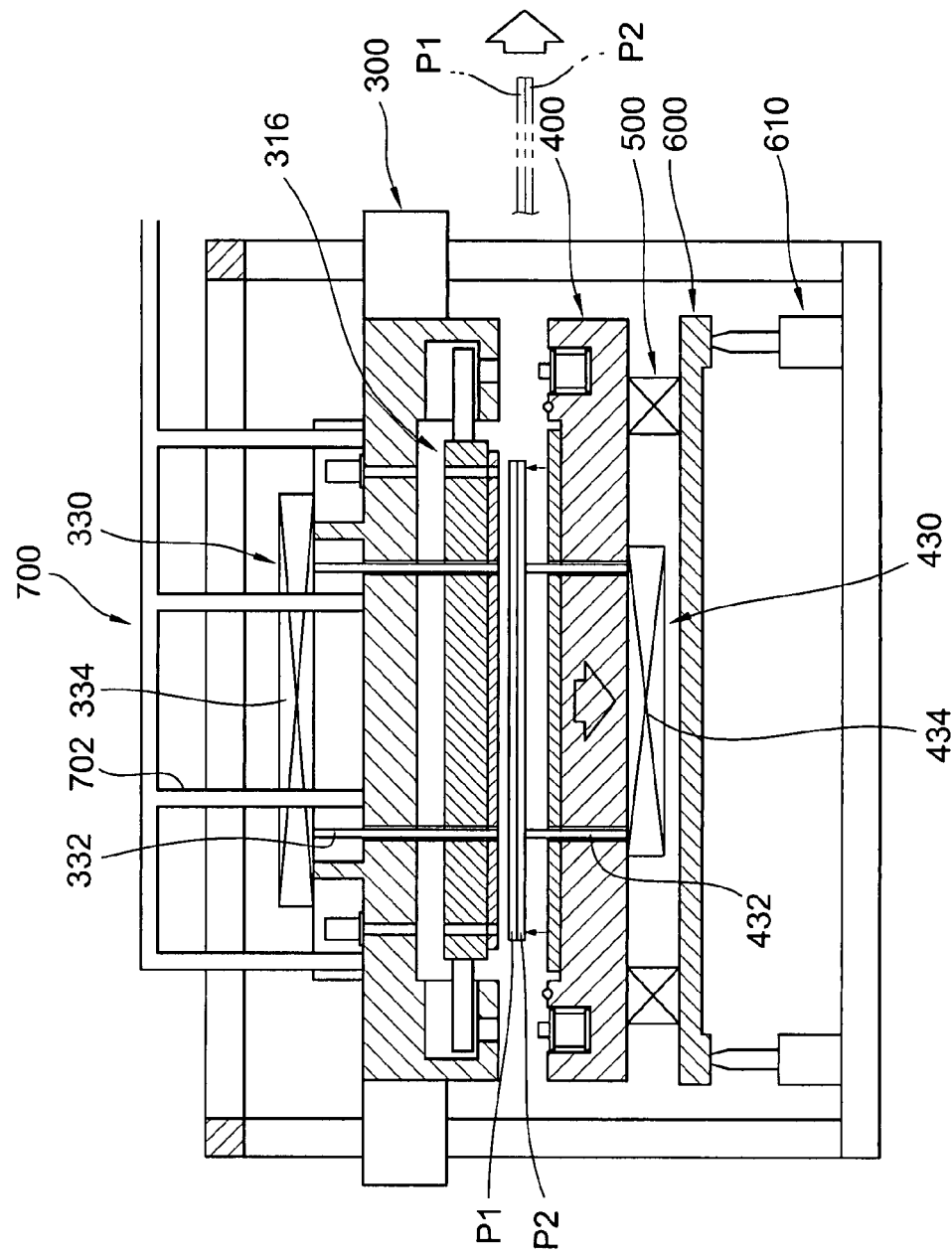
FIG. 15 is an operation diagram of a substrate discharging operation of the apparatus of FIG. 1.

Referring to FIG. 15, after the first and second substrates P1 and P2 are attached to each other, the attachment space returns to an atmospheric pressure state (S109), and the attached first and second substrates P1 and P2 are discharged from the apparatus 100 (S110). In this case, the attachment space returns to the atmospheric pressure state because atmospheric pressure is easier to control. In addition, no additional process is required because the first and second substrates P1 and P2 are discharged in the atmospheric pressure state.

In an apparatus for attaching substrates of a flat display panel according to the present invention, a lower chamber is raised toward an upper chamber. Therefore, permeation of particles into a chamber due to the opening of the chamber can be prevented.

Furthermore, since the structure of the upper and lower chambers is improved, a change in the alignment and gap between substrates after the substrates are aligned can be minimized.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, various variations and modifications are possible in the component parts and/or arrangements which would fall within the scope of the disclosure, the drawings and the appended claims. In addition to variations and modifications in the component parts and/or arrangements, alternative uses will also be apparent to those skilled in the art.

What is claimed is:

1. An apparatus for attaching substrates of a flat display panel to each other, the apparatus comprising:
    a frame;
    an upper chamber fixed to an upper part of the frame and to which a first substrate is attached;
    a lower chamber disposed under the upper chamber and to which a second substrate is attached, wherein the lower chamber is elevated towards the upper chamber;
    a lifter located below the lower chamber that elevates the lower chamber and that controls a gap between the upper chamber and the lower chamber in a vertical direction; and
    a position control stage interposed between the lower chamber and the lifter, wherein the position control stage adjusts at least a horizontal position of the lower chamber relative to the upper chamber.

2. The apparatus of claim 1, wherein the upper chamber comprises:
    an upper chamber body fixed to the upper part of the frame and having a sunken portion, which forms part of an attachment space, formed in a bottom surface thereof; and
    an exhaust device connected to the sunken portion, wherein the exhaust device exhausts gases from the sunken portion to create a vacuum in the sunken portion.

3. The apparatus of claim 2, wherein a plurality of ribs is formed on a top surface of the upper chamber body, and wherein the plurality of ribs reinforces the upper chamber body to prevent the upper chamber body from being deformed by the force of a vacuum pressure generated during a substrate attachment process.

4. The apparatus of claim 3, wherein the plurality of ribs comprises a first rib that extends in one direction and a second rib that crosses the first rib.

5. The apparatus of claim 2, wherein the upper chamber body further comprises:
    an upper stage disposed in the sunken portion and to which the first substrate is attached; and
    a camera device that penetrates through the upper chamber body and the upper stage such that the camera device observes an alignment of the first substrate relative to the second substrate.

6. The apparatus of claim 5, wherein the upper stage comprises an upper chuck that holds the first substrate.

7. The apparatus of claim 5, wherein at least one penetration hole penetrates the upper chamber body and the upper stage such that the camera device observes an alignment of the first substrate and the second substrate through the at least one penetration hole from an outside of the upper chamber.

8. The apparatus of claim 5, wherein the camera device either observes overlapping alignment marks of the first and second substrates or observes two or more overlapping corners, which are diagonal to each other, of the first and second substrates.

9. The apparatus of claim 2, wherein the upper chamber body further comprises:
    a plurality of separation pins that penetrates through the upper chamber body and the upper stage; and
    a separation pin operator installed outside the upper chamber body, wherein the separation pin operator elevates and lowers the plurality of separation pins.

10. The apparatus of claim 9, wherein each of the plurality of separation pins is tube-shaped and has a through-hole, and wherein each of the plurality of separation pins is connected to the exhaust device so that a vacuum pressure generated by the exhaust device is applied through the plurality of separation pins.

11. The apparatus of claim 2, wherein the exhaust device comprises:
    an exhaust pipe connected to the attachment space; and
    a vacuum pump connected to the exhaust pipe that provides vacuum pressure to the attachment space.

12. The apparatus of claim 11, wherein N₂ gas is supplied through the exhaust pipe so that the first and second substrates are closely attached to each other by a pressure difference in a substrate attachment process.

13. The apparatus of claim 1, wherein the lower chamber comprises:
 a lower chamber body closely attached to the upper chamber to form an attachment space, wherein the lower chamber body is elevated and lowered by the lifter, wherein the position control stage is interposed between the lifter and the lower chamber body, and wherein the position control stage acts to adjust an alignment of the first substrate and the second substrate.

14. The apparatus of claim 13, wherein the lower chamber body further comprises:
 a lower stage installed on a top surface of the lower chamber body and to which the second substrate is attached; and
 a sealing member that extends from an outer circumferential surface of the lower stage.

15. The apparatus of claim 14, wherein the lower chamber body further comprises:
 a plurality of elevation pins that penetrates through the lower chamber body and a lower chuck; and
 an elevation pin operator installed outside the lower chamber body, wherein the elevation pin operator raises and lowers the plurality of elevation pins.

16. The apparatus of claim 14, wherein the lower stage comprises a lower chuck that holds the second substrate, and wherein the lower chuck is an electrostatic chuck that holds the second substrate by an electrostatic force.

17. The apparatus of claim 14, wherein a mounting groove is formed in a bottom surface of the lower chamber body and recessed inwardly of the lower chamber body, and the position control stage is inserted into the mounting groove.

18. The apparatus of claim 14, wherein the position control stage comprises:
 an x-axis transferring device that moves the lower chamber body in an x-axis direction;
 a y-axis transferring device that moves the lower chamber body in a y-axis direction; and
 a θ-axis rotation device that acts to rotate the lower chamber body around a θ-axis.

19. The apparatus of claim 18, wherein the position control stage further comprises:
 an x-axis idle device disposed opposite the x-axis transferring device that guides an x-axis movement of the lower chamber body;
 a y-axis idle device disposed opposite the y-axis transferring device that guides a y-axis movement of the lower chamber body; and
 a θ-axis idle device disposed opposite the θ-axis transferring device that guides a θ-axis rotation of the lower chamber body.

20. The apparatus of claim 1, wherein the lifter comprises:
 an elevation plate that supports the position control stage; and
 a plurality of elevation devices installed, respectively, at corners of the elevation plate that act to elevate the elevation plate while controlling a gap between the first substrate mounted on the upper chamber and the second substrate mounted on the lower chamber.

21. The apparatus of claim 20, wherein each of the plurality of elevation devices comprises:
 an elevation pole that supports a corner of the elevation plate; and
 an elevator that elevates the elevation pole and generates a vertical movement of the elevation plate.

22. The apparatus of claim 1, further comprising:
 an upper stage to which the first substrate is attached and that is elevated with respect to the upper chamber; and
 a gap controller installed between the upper and lower chambers, wherein the gap controller senses an amount of operation required to move the upper stage and a distance traveled by the upper stage, and that corrects an amount of operation required to move the upper stage.

23. The apparatus of claim 22, wherein the gap controller comprises:
 an actuator mounted on the lower chamber that acts to elevate the upper stage;
 an encoder that senses an amount of operation of the actuator;
 a distance sensor that senses a distance by which the upper stage is moved by the actuator; and
 a controller that compares the amount of operation sensed by the encoder to an amount of movement of the upper stage sensed by the distance sensor and that controls the amount of operation of the actuator based on the comparison result.

24. The apparatus of claim 23, wherein a plurality of support bars extends from respective ends of the upper stage, and wherein the gap controller comprises a plurality of actuators, wherein each of the plurality of actuators supports a lower part of a corresponding one of the plurality of support bars.

25. The apparatus of claim 24, wherein a V-shaped notch is formed at an upper end of each of the plurality of actuators and wherein the V-shaped notch of each of the plurality of actuators supports a corresponding one of the plurality of support bars to prevent slipping of each of the plurality of support bars relative to the plurality of actuators.

26. The apparatus of claim 1, wherein the position control stage further adjusts at least a vertical position or an angular position of the lower chamber relative to the upper chamber in addition to the horizontal position.

* * * * *